E. Y. MOORE.
TROLLEY.
APPLICATION FILED FEB. 2, 1915.

1,136,699.

Patented Apr. 20, 1915.

WITNESSES
Justin W. Macklin
Gertrude K. Smith

INVENTOR
Edward Y. Moore,
BY Albert H. Baker,
ATT'Y

UNITED STATES PATENT OFFICE.

EDWARD Y. MOORE, OF CLEVELAND, OHIO.

TROLLEY.

1,136,699.

Specification of Letters Patent.  Patented Apr. 20, 1915.

Application filed February 2, 1915. Serial No. 5,791.

*To all whom it may concern:*

Be it known that I, EDWARD Y. MOORE, a citizen of the United States, residing at Cleveland, in the county of Cuyahoga and State of Ohio, have invented a certain new and useful Improvement in Trolleys, of which the following is a full, clear, and exact description, reference being had to the accompanying drawings.

This invention relates to a trolley adapted to ride on the lower flanges of an I-beam and support a load.

The object of the invention is to provide simple and effective means for enabling the wheels on one side to be retracted from normal position so that the trolley may be removed from the trackway at any point.

The invention comprises the means by which I accomplish this result, as hereinafter explained and claimed.

Figure 1:
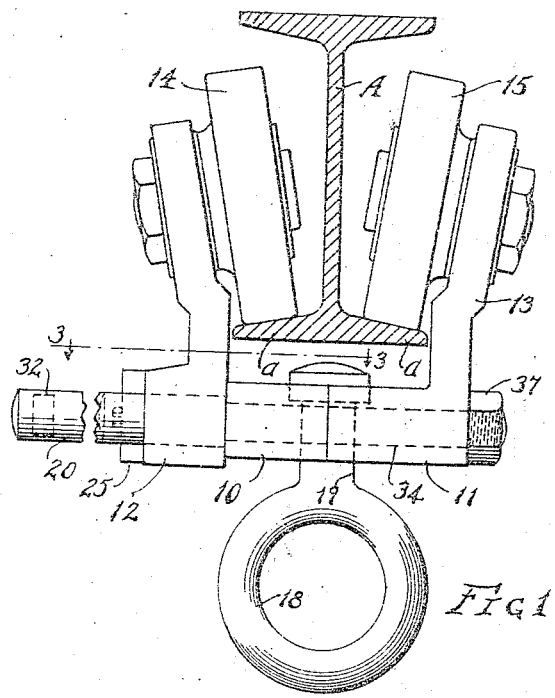
Figure 3:
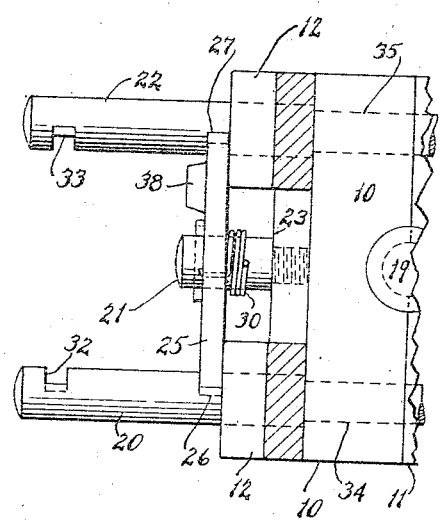
Figure 2:
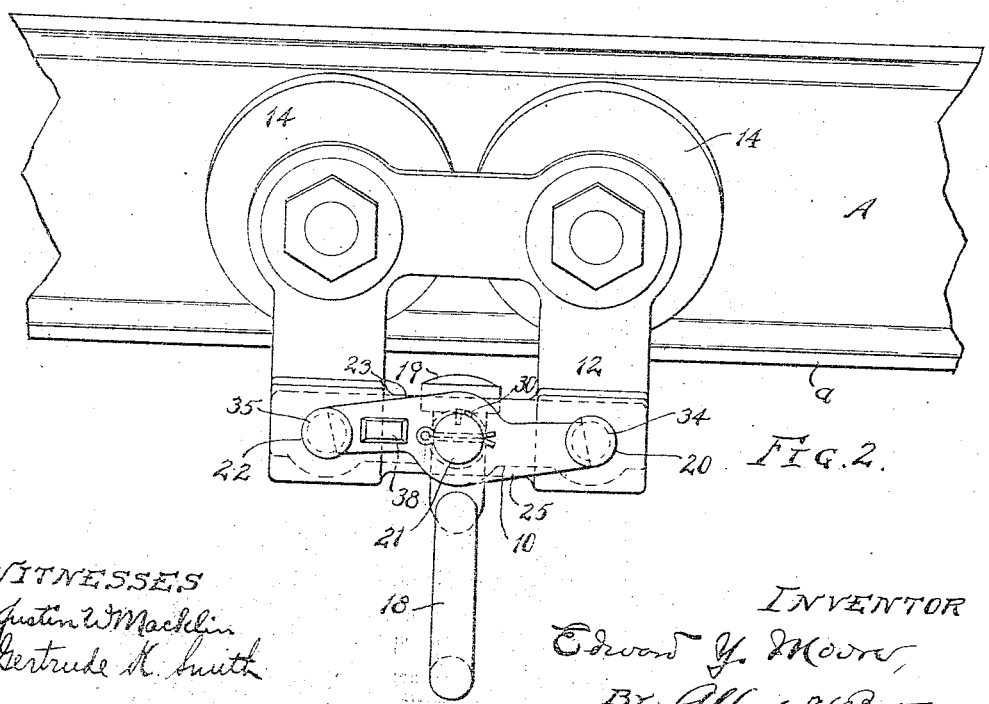

In the drawings, Figure 1 is an end view of a trolley embodying this invention; Fig. 2 is a side elevation thereof; and Fig. 3 is a horizontal section on the line 3—3 of Fig. 1.

In Figs. 1 and 2, A represents an I-beam having flanges $a$ on which the trolley is adapted to run.

As shown, the trolley frame comprises two members 10 and 11 secured together beneath the I-beam, two upstanding members 12 and 13 extending above the I-beam flanges, and two pairs of wheels 14 and 15 mounted on studs projecting inwardly from these upstanding members. The frame carries a suitable load support which may be a simple loop or a hoist, or any other desired supporting device. The eye 18 having a shank 19 swiveled between the frame members 10 and 11 is intended to illustrate any load support.

As shown, the upstanding side 13 is rigid and integral with the under portion of the frame 11, and this side is shown as consisting of an inverted U-shaped extension of the lower portion, though the construction on this side may be varied, as desired. On the other side of the trolley, I make the member 12 which carries the wheels 14 slidable in and out on the rest of the frame, so that the pairs of wheels may be separated to allow the trolley to be removed from the I-beam support whenever desired. This construction will now be described.

Extending from the trolley frame member 10 are two studs 20 and 22, on which are mounted the upstanding member 12, which may conveniently be of inverted U-shape. On a stud 21 carried by a connecting portion 23 of the member 12, is mounted a two-armed locking lever 25 which may be turned on its support. This locking lever has its end portions standing just outside of the legs of the wheel-carrier 12, and these end portions are adapted to engage notches 26 and 27 in the studs 20 and 22, thus locking the wheel-carrier 12 rigid to the rest of the frame. A spring 30 mounted on the stud and having one end engaging the lever and the other connected with the stud or its support, acts to hold the lever in engagement with the notches in the studs.

To remove the trolley from the track whenever desired, it is only necessary to swing the lever 25 on its pivot sufficiently to cause it to clear the studs 20 and 22 and then to slide outwardly the member 12, and the lever 25. When the frame member 12 has been moved outwardly far enough to enable the trolley wheels to clear the edges of the I-beam flanges, the lever 25 comes opposite a second pair of notches 32 and 33 in the studs 20 and 22, and, by springing into these notches, locks the frame member 12 against entire removal from the rest of the frame. If desired, however, the lever 25 may be swung from this position to enable the frame portion 12, with its wheels, to be removed entirely from the rest of the trolley.

The studs mentioned are secured to the respective members in any desired manner. I have shown the stud 21 as tapped into the connecting portion 23 of the member 12, and the studs 20 and 22 as having reduced extensions 34 and 35 projecting through the frame members 10 and 11 and carrying nuts 37 on their far ends. These nuts serve the triple purpose of holding the studs in place, holding the two parts 10 and 11 of the frame together, and securing the swiveled shank and head of the eye in place.

It should be noticed that the end faces of the lever 25 are at an oblique angle to the length of the lever, and thus have a wedging action under the influence of the spring 30 in the notches of the studs, insuring a tight locking engagement. To conveniently release the lever I provide a boss 38 on the outer side thereof, against which a blow may be delivered to turn the lever on its pivot.

Having thus described my invention, what I claim is:

1. In a trolley, the combination of a frame portion adapted to lie beneath the flange of a supporting I-beam and an upwardly extending portion rigidly connected with the portion first mentioned, a pair of supporting wheels carried on the inner side of the upwardly extending portion, a member carrying a pair of wheels on the opposite side of the I-beam, said member being movable as a unit and slidably guided on the frame portion first mentioned, whereby it may be slid outwardly to carry its wheels clear of the supporting flange while retaining its engagement with the frame.

2. In a trolley adapted to ride on the lower flange of an I-beam, the combination of a frame portion adapted to stand below the I-beam flange and an upstanding portion on one side extending above such flange, a pair of wheels carried on the inner side of the upstanding portion, an upstanding member on the opposite side movable as a unit and carrying a pair of wheels, means projecting from the side of the frame portion first mentioned and forming a seat on which such unitarily movable member is slidably mounted, and means for locking such member in position.

3. In a trolley, the combination of a partial frame adapted to lie beneath an I-beam flange and extend upwardly onto one side thereof, wheels on the inner side of the upwardly extending portion, and a pair of studs projecting rigidly from the portion below the I-beam flange, a member movable as a unit and slidably mounted on said studs and serving to complete the trolley frame, and wheels carried on the inner face of said member.

4. In a trolley, the combination of a frame member adapted to stand beneath an I-beam flange, an upstanding member carried thereby and extending above one of the flanges, a pair of wheels carried by such member, an upstanding member on the other side, a pair of wheels carried by it and adapted to ride on the other flange of the I-beam, the last mentioned upstanding member being slidably mounted on an extension of the frame below the flange, and a lever adapted to lock such slidably mounted member in place.

5. In a trolley, the combination of a frame member provided with means for supporting a load, an upstanding member connected therewith and having a wheel, a stud extending from the other side of such frame member, an upstanding member slidably mounted on said stud and carrying a wheel, and a locking device adapted to engage a notch in said stud to hold the slidable member in position.

6. The combination with two pairs of supporting wheels, of a trolley frame connected therewith and comprising parts which have relative movement, one of such parts being adapted to stand beneath the I-beam and having a pair of projecting studs, and the other part being of inverted U-form, the legs of which slidably surround said studs.

7. The combination, with two pairs of supporting wheels, of a trolley frame connected therewith and comprising parts which have relative movement, one of such parts being adapted to stand beneath the I-beam and having a pair of projecting studs, the other part slidably embracing said studs, and an intermediately pivoted lever adapted to engage notches in the two studs and lock said other part in position and adapted to be swung on its pivot to release such other part.

8. The combination, with the wheels of a two-part trolley frame supported thereby, one part of the frame having a pair of parallel studs and the other part of the frame slidably embracing said studs, and an intermediately pivoted lever adapted to engage notches in the two studs to lock the said other part of the frame in position, and means for maintaining the lever in such engagement.

9. The combination, with a portion of a trolley frame having a load support and a pair of projecting studs with notches therein, of another portion of the trolley frame carrying wheels and slidable on said studs, a lever pivotally mounted between the studs and adapted to engage said notches to lock the parts of the trolley frame in normal position, and a second pair of notches which said lever may engage to lock the trolley frame in spread position.

10. The combination, with supporting wheels adapted to ride on the opposite flanges of an I-beam, of a frame portion adapted to stand beneath the flanges and connected with the wheels on one side, two studs projecting in the opposite direction from said frame portion, an upstanding member on the other side carrying a pair of wheels and slidably mounted on said studs, a lever pivotally mounted on a part of the upstanding member, two pairs of notches in said studs, and a spring constraining said lever toward the notches but allowing it to be released therefrom and moved laterally with that side of the frame.

11. The combination with supporting wheels, of a frame composed of relatively movable parts carried by said wheels, a locking lever adapted to hold the frame parts together in normal position, and a torsional spring acting on said lever and tending to press it into engaging position.

12. In a trolley, the combination, with the wheels, of a frame supported thereby and having two parts movable one relative to the other, and means for locking said parts to each other in two different positions, one of which has the wheels close enough together to ride on the flange of an I-beam which may be cleared by the wheels when in their other position.

13. In a trolley, the combination of a frame portion adapted to lie beneath the flange for supporting an I-beam and an upwardly extending portion rigidly connected with the portion first mentioned, a pair of supporting wheels carried on the inner side of the upwardly extending portion, a member carrying a pair of wheels on the opposite side of the I-beam, said member being movable as a unit and slidably guided to move in and out horizontally, and means for locking said member in position.

14. A trolley frame having a portion adapted to stand beneath an I-beam and portions extending upwardly above the edges of the I-beam flange, one of said upwardly extending portions being rigid with reference to the portion below the flange, and the other upwardly extending portion being movable as a unit with reference to the portion below the flange and guided to move in and out thereon in a straight line, a movable locking device for holding the latter portion in normal position, and two pairs of wheels mounted on the inner sides of the two upwardly projecting portions respectively.

15. A trolley frame having a portion adapted to stand beneath an I-beam and portions extending upwardly above the edges of the I-beam flange, one of said upwardly extending portions being movable with reference to the portion below the flange and guided to move in and out thereon in a straight line, a shiftable locking device adapted to hold the last mentioned portion of the frame interchangeable either close to the portion below the I-beam flange or comparatively distant from it, and pairs of wheels carried on the inner faces of the upwardly projecting frame portions and adapted to engage or clear the I-beam flange, according to the position of the movable frame member.

In testimony whereof, I hereunto affix my signature in the presence of two witnesses.

EDWARD Y. MOORE.

Witnesses:
　JUSTIN W. MACKLIN,
　ALBERT H. BATES.